United States Patent [19]

Murray

[11] Patent Number: 5,443,866
[45] Date of Patent: Aug. 22, 1995

[54] UNI-AXIALLY CO-ORIENTED THERMOPLASTIC FILM AND BAGS MADE THEREFROM

[75] Inventor: Charles R. Murray, Brampton, Canada

[73] Assignee: At Plastics Inc., Ontario, Canada

[21] Appl. No.: 19,674

[22] Filed: Feb. 19, 1993

[51] Int. Cl.⁶ .............................................. B29D 22/00
[52] U.S. Cl. ..................... 428/35.7; 428/475.8; 428/500; 428/516; 428/517; 428/910
[58] Field of Search ............... 428/910, 500, 475.8, 428/516, 517, 35.7

[56] References Cited

U.S. PATENT DOCUMENTS

| | | | |
|---|---|---|---|
| 3,176,052 | 3/1965 | Peticolas | 264/897 |
| 3,380,868 | 4/1968 | Moser | 156/229 |
| 4,022,646 | 5/1977 | Casey | 428/516 |
| 4,252,851 | 2/1981 | Lansbury et al. | 428/516 |
| 4,339,507 | 7/1982 | Kurtz et al. | 428/522 |
| 4,367,256 | 1/1983 | Biel | 428/218 |
| 4,399,180 | 8/1983 | Briggs et al. | 428/212 |
| 4,418,114 | 11/1983 | Briggs et al. | 428/218 |
| 4,469,752 | 9/1984 | Yoshimura | 428/475.8 |
| 4,518,654 | 5/1985 | Eichbauer et al. | 428/331 |
| 4,542,188 | 9/1985 | van der Heijden | 525/240 |
| 4,588,650 | 5/1986 | Mientus et al. | 428/516 |
| 4,664,866 | 5/1987 | van der Heijden | 264/519 |
| 4,705,719 | 11/1987 | Yamanaka et al. | 428/517 |
| 4,842,922 | 6/1989 | Krupp et al. | 428/198 |
| 4,863,769 | 9/1989 | Lustig et al. | 428/34.9 |
| 4,913,977 | 4/1990 | Taka et al. | 428/516 |
| 4,943,780 | 7/1990 | Redding | 428/35.9 |
| 4,976,898 | 12/1990 | Lustig et al. | 264/22 |
| 5,019,315 | 5/1991 | Wilson | 264/171 |
| 5,110,686 | 5/1992 | Taka et al. | 156/164 |
| 5,294,398 | 3/1994 | Taka et al. | 264/288.4 |

FOREIGN PATENT DOCUMENTS

| | | |
|---|---|---|
| 1157216 | 4/1992 | Canada . |
| 1189218 | 5/1992 | Canada . |
| 465681A | 1/1991 | European Pat. Off. . |
| 0291166A2 | 2/1991 | European Pat. Off. . |
| 0404368A2 | 4/1991 | European Pat. Off. . |
| 1439763 | 8/1966 | France . |
| 2128199 | 3/1990 | United Kingdom . |

OTHER PUBLICATIONS

Copending application Serial No. 07/719,228 filed Jun. 21, 1991 by M. B. Biddle, et al., titled "Polyethylene Blends for Molding".

Primary Examiner—Edith Buffalow
Attorney, Agent, or Firm—Cushman, Darby & Cushman

[57] ABSTRACT

Thermoplastic uni-axially co-oriented film, method of making the film and heavy-duty shipping bags made therefrom. The method allows for the manufacture of heavy duty bags made from blown thermoplastic films. Shipping, such as courier, bags have improved strength, puncture and snag resistance.

7 Claims, 2 Drawing Sheets

UNI-AXIALLY CO-ORIENTED THERMOPLASTIC FILM AND BAGS MADE THEREFROM

FIELD OF THE INVENTION

This invention relates to thermoplastic, cold drawn oriented film and to sacks Wade therefrom.

BACKGROUND OF THE INVENTION

Thermoplastic sacks and bags are used in the packaging, transportation or storage of a great variety of materials ranging from confidential documents, powders and granules, bulky and lightweight materials, and agricultural materials such as hay and silage. The thermoplastic bags according to this invention have general applicability to such products.

Bulky, but lightweight materials such as fibreglass insulation and peat moss are generally shipped in compressed form in thermoplastic sacks. These sacks are generally known as tubular insulation sacks or bags and take the form of an extended envelope or tube sealed at one end prior to its being filled with product. For the most part these bags are produced by the commonly known in the art "blown film" process, which owes its popularity to the fact that it can be quickly and readily adapted to the production of different widths and thicknesses of continuous tubes which can then be easily cut to length and sealed at one end to produce an open top bag.

It will be readily appreciated that the thinner the film thickness (gauge), commensurate with acceptable film properties, the less the amount of thermoplastic material required. This downgauging of sack wall thickness is a most desirable industrial goal. Walls of sacks produced as tubes by the blown film process, typically, have a film thickness in the range of 3-6 mil, which is generally determined by the machine direction tensile strength necessary to handle the package weight, the film stretch resistance required to prevent expansion of the compressed product and the puncture resistance of the bag for distribution handling. The tubes from which these sacks are commonly made are produced with a bubble diameter/die diameter generally of 3:1 in order to optimize film strength properties.

The typical film manufacturing process basically comprises the step of extruding molten thermoplastic material through a circular die, typically having a 0.125 cm die gap to form a tube which is closed by passing an end through a set of nip/draw rolls. Air is introduced through the die centre to inflate the film tube to the desired width and thickness-while the speed of the nip rolls is increased to draw the film thickness down to the desired gauge. For most out-of-line bag making operations the film tube is then trim slit to the desired size and wound up into two film rolls which are then slit and passed to the converting operation of printing and bag making.

Typically, in the simplest version of the blown film process, the film tube is produced as above having a 3:1 blow ratio to provide a non-oriented film of three-times the thickness of the desired finished bag, while the film width is, typically, approximately 10 cm wider. The film tube is slit into sheeting which is passed to a machine direction orienter, where it is drawn down below the melting point of the thermoplastic material, for example, at 105° C. for a linear low density polyethylene, over a narrow gap (typically 0.125 cm) between nip rolls to the desired finished bag thickness. This cold drawn film may then be manufactured into bags by methods known in the art.

While the above general method is suitable for the production of light gauge film, particularly for use in multi-ply bags, it is not generally suitable for heavy gauge film production. For example, it is difficult to produce by the blown film process linear low density polyethylene film of a thickness greater than 0.015 cm, at a blow ratio of 3:1. This is because the hot melt strength of these films is insufficient to support the bubble, whereby the latter droops causing gauge and width control to be lost.

In view of the usefulness of the blown film process for producing film in tubular and, subsequently, sheet form there is a need to extend this usefulness to enable heavy gauge oriented film and bags made therefrom to be readily manufactured.

It is an object of the present invention to provide an improved method for making heavy gauge oriented film involving the blown film process.

It is a yet a further object of the present invention to provide heavy gauged oriented film.

It is a yet further object of the present invention to provide improved bags comprising heavy gauge oriented film.

SUMMARY OF THE INVENTION

In one aspect the invention provides a thermoplastic uni-axially co-oriented film.

By the term "thermoplastic", as used in this specification and claims is meant any thermoplastics material capable of providing a uni-axially co-oriented film, ply or layer of suitable thickness and strength for a bag. Of particular use are thermoplastics of the polyethylene, polypropylene and polybutadiene family of polymers. As examples, high density and linear low density polyethylenes and 1,2 polybutadienes may be mentioned. However, polyvinyl chlorides, polyesters, such as nylons, and polystyrenes are further examples of thermoplastic materials of use in the practice of the invention when embodiments of such materials are so compatible with another thermoplastic material under the practice of the invention as to be able to form a unified uni-axially co-oriented film.

The term "polyethylene" includes ethylene homopolymers and copolymers, such as vinyl acetate, acrylic acid, methyl methacrylate, butene, n-hexene, 4-methyl-1-pentene and octene copolymers with ethylene; and blends thereof.

By the term "co-oriented" film, laminate or ply is meant the resultant film or ply made by the cold drawing of a plurality of thermoplastic films, simultaneously in such close contact together that under the influence of the drawing step at the drawing temperature that the films become intimately associated and unified into a single resultant film or ply. Each of the plurality of films has been uni-axially oriented and, accordingly, the resultant film constitutes a unified uni-axially co-oriented film.

In a preferred aspect the thermoplastic material comprises a linear low density polyethylene.

A film according to the invention may be satisfactorily manufactured by feeding the blown film tube in collapsed form, so as to constitute a two-plies system, directly to the machine direction orienter, instead of slitting the blown film tube into sheeting prior to cold drawing. The cold drawing operation on the collapsed tube causes the two plies of film to unify, while each is being uni-axially oriented to, thus, provide the uni-axially co-oriented film, single ply or sheet.

Prior art, namely, U.S. Pat. No. 4677,007, commonly assigned, issued Jun. 30, 1987, teaches that excessive "blocking" or internal heat tacking of the walls of the tubular film during the cold drawing process may be overcome by the addition of an inorganic filler e.g. silica or calcium carbonate powder, at a typical concentration of 1% w/w to the formulation, to prevent such welding. Thus, unification of the plies of the tubular film during the cold drawing process is viewed as being undesirable. Further, the prior art teaches the need for the additional step of slitting the tubing into sheets prior to cold drawing. Accordingly, the above prior art clearly leads away from the present invention.

Should a yet heavier gauge of uniform uni-axially co-oriented film be desired, a collapsed blown film tube could be readily folded to provide a plurality of plies, now greater then two, for feeding to the cold drawing machine direction orienter.

Alternatively, several film webs of dissimilar non-oriented thermoplastic materials may be formed into a single uni-axially co-oriented film. Thus, for example, black and white pigment-containing films, non-metallized and metallized films, and polyethylene and nylon films may be suitably unified.

The films of the present invention are clearly distinguished over laminated films in that the latter comprise at least two distinct films or plies which adhere to each other, directly, or by means of an adhesive. The films or plies remain in the lamination as distinct and disparate films, which often can be subsequently separated one from the other.

The films of the present invention are also distinguished over co-extruded films in that to produce the latter, two or more films, typically, each in the form of blown film tubes adhere to each other under hot, non-machine direction orienting conditions to provide non-uni-axially oriented films. To provide uni-axial orientation to a co-extruded film, at desirable machine direction to original film length draw ratios of about 3:1 to 4:1, requires a blown film tube gauge of at least 9 mil, which film is most difficult to handle under the bubble method, as hereinbefore described. Accordingly, co-extruded film comprising a plurality of films are not, subsequently, cold drawn.

Cold drawing of a thermoplastic film is distinguished from hot drawing in that in the former process the film is stretched below the melting point of the thermoplastic material, while crystallites are present. In the hot drawing process, drawing and orientation occurs until crystallization.

Thus, in a further aspect the invention provides a method Of manufacturing a thermoplastic, unified cold drawn uni-axially co-oriented film comprising the steps of: feeding, simultaneously, a plurality of thermoplastic non-oriented films to a cold draw orienter, and cold drawing said plurality of non-oriented films wherein said films are in such close proximity, one to another under said cold drawing as to form said unified uni-axially co-oriented film from said plurality of films.

The method as hereinbefore defined is of particular value where the plurality of non-oriented films comprises the walls of a collapsed blown film tube.

Accordingly, the invention further provides a method of manufacturing a thermoplastic, unified cold drawn uni-axially co-oriented film comprising the steps of:

extruding a molten thermoplastic material through a die to form an extruded tube;
collapsing said tube to provide a flattened tube constituting a plurality of non-oriented films;
feeding said flattened tube to a cold draw orienter; and cold drawing said tube in a single direction wherein said plurality of non-oriented films are in such close proximity one to another under said cold drawing as to form said unified uni-axially co-oriented film.

The methods as hereinbefore defined may be advantageously modified to provide uni-axially co-oriented film from blown films formed of dissimilar material.

Accordingly, the invention yet further provides a method of manufacturing a thermoplastic, unified cold drawn uni-axially co-oriented film comprising the steps of:

extruding a molten first thermoplastic material through a die to form a first extruded tube;
collapsing said first extruded tube to provide a first flattened tube;
extruding a molten second thermoplastic material through a die to form a second extruded tube;
collapsing said second extruded tube to provide a second flattened tube;
feeding, simultaneously, at least said first flattened tube and said second flattened tube to a cold draw orienter; and cold drawing said first flattened tube and said second flattened tube in a single direction wherein said tubes are in such close proximity one to another under said cold drawing as to form said unified uni-axially co-oriented film.

In yet a further aspect, the invention provides a thermoplastic bag comprising film produced by a process as hereinbefore defined or film as hereinabove defined.

The practice of the invention is clearly of value with thermoplastic materials that are individually capable of being cold drawn to produce uni-axially oriented film. The invention is of more value when the pre-cold drawn film is manufactured by the blown film process. However, the invention is also of value when practised with non-oriented film made by alternative methods, such as by cast, lamination or co-extrusion processes.

Bags according to the invention may be manufactured by processes described in our commonly assigned U.S. Pat. No. 4,576,844 issued Mar. 18, 1986; 4,672,684 issued Jun. 9, 1987; 4,677,007 as hereinbefore mentioned; 4,680,207 issued Jul. 14, 1987; and No. 4,681,781 issued Jul. 21, 1987. The subject-matter of these references is incorporated herein by reference.

Thus, bags as mentioned hereinbefore may be manufactured comprising cold drawn uni-axially co-oriented of desired heavy gauged film and, preferably made from thin gauge blown film. Further, bags according to the invention may be made comprising lighter gauge film than as hereto made. For example, a prior art heavy duty thermoplastic shipping sack (Amex TM, trademark of ICI PLC) wherein the outer 2 mil wall consists of a five-layer co-extrusion consisting of a central 0.2 mil layer of nylon adhered on each side by a 0.1 mil layer of adhesive (ethylene-acrylic acid copolymer) to a 0.8 mil linear low density polyethylene, can be favourable substituted with a co-oriented bag according to the invention wherein the outer 2 mil wall comprises only 0.0667 mil nylon. This is effected by cold-drawing, according to the invention, a sandwich of the 2 mil thin gauge co-extruded five-layer film between two 2 mil plies of linear low density polyethylene at a 3:1 machine direction draw ration. The resultant 2 mil film has a nylon layer of only 0.0667 mil. In effect, the practice of the invention in this embodiment, results in a financial saving by the substitution of 0.1333 mil nylon with linear low density polyethylene, and improved puncture resistance properties.

Other preferred bags according to the invention are those known as "courier bags" used in the transportation of documents and valuable papers. Such bags are, typically, formed of 3 mil gauge thermoplastic film consisting of an extrusion of an outer 2.25 mil high density polyethylene, made opaque with titanium dioxide pigment, and an inner liner of 0.75 mil ethylene-vinyl acetate copolymer containing aluminum powder. The film of these prior art courier bags is non-uniaxially oriented and in order to impart orientation to the film at a 3:1/4:1 draw ratio, the resultant co-extruded blown film would need to be at least 9 mil gauge subject to the attendant drawbacks as hereinbefore described.

However, by simultaneously cold drawing, according to the invention, a flattened tube of 4.5 mil ply of titanium dioxide-containing high density polyethylene with a flattened tube of 1.5 mil ply of metallic aluminum/EVA copolymer, at a machine draw ratio of 4:1, a 3 mil uni-axially co-oriented unified film is provided. Tubes of such 4.5 mil and 1.5 mil gauge can be readily and satisfactorily manufactured by the blown film process. The resultant cold drawn composite film as hereinbefore described has improved physical properties, such a enhanced puncture resistance.

While it is generally accepted that all polyethylene film is generally uni-axially-oriented to some degree, the terms of "uni-axially oriented" or "co-oriented" when used with reference to polyethylene in this specification and claims means polyethylene film that has been blown and cold drawn to at least a 2.5-fold extent, preferable to a 4-fold extent, but also up to a 6-fold extent.

BRIEF DESCRIPTION OF THE DRAWINGS

Several embodiments of this invention will now be described by way of example only with reference to the accompanying drawings, in which.

DETAILED DESCRIPTION OF PREFERRED EMBODIMENTS

Figure 1:
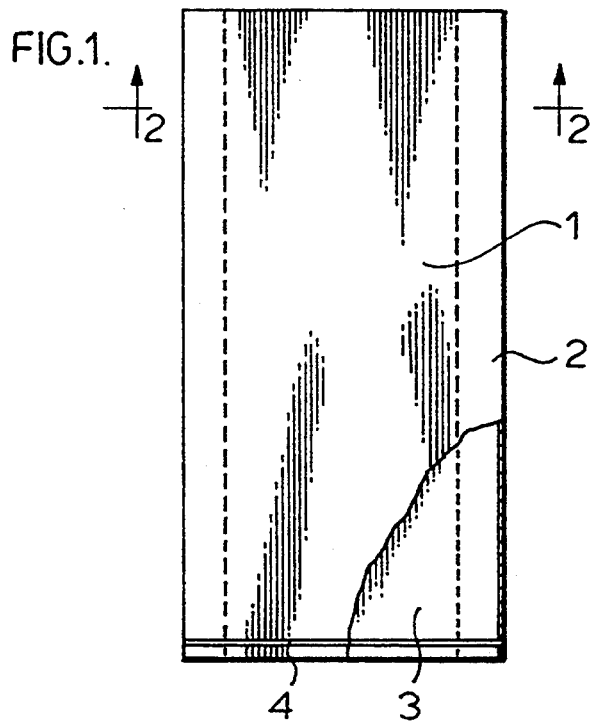
FIG. 1 shows a front elevational view, partly cut away, of an open-top tubular sack according to the invention.
Figure 2:
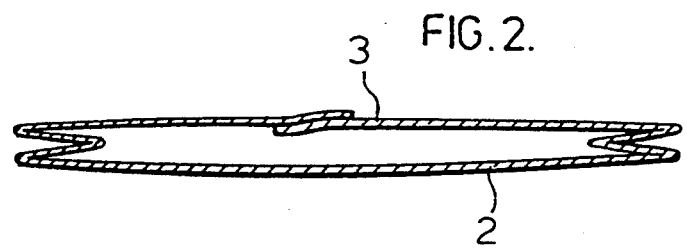
FIG. 2 is a sectional view along 2—2 of FIG. 1.

FIGS. 1 and 2 show a generally rectangular single-ply tubular sack 1 having a front wall 2 and a back wall 3 formed from a unified uni-axially co-oriented film made by cold drawing a sandwich of 5 mil co-extruded five-layer laminate between two 2 mil plies of linear low density polyethylene at a 3:1 machine direction draw ratio. The co-oriented film has a nylon layer of only 0.0667 mil. One end of the tubular sack is heat sealed at 4 to form a 4 mil back-seamed single-ply open-top sack.

Figure 4:
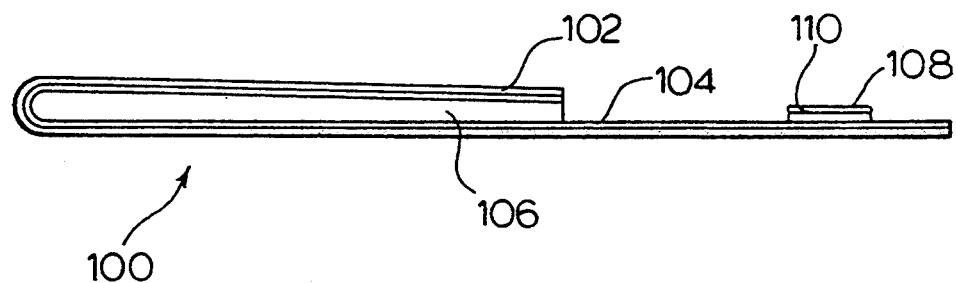
FIG. 4 represents a schematic cross-sectional area of the courier bag of FIG. 3.
Figure 5:
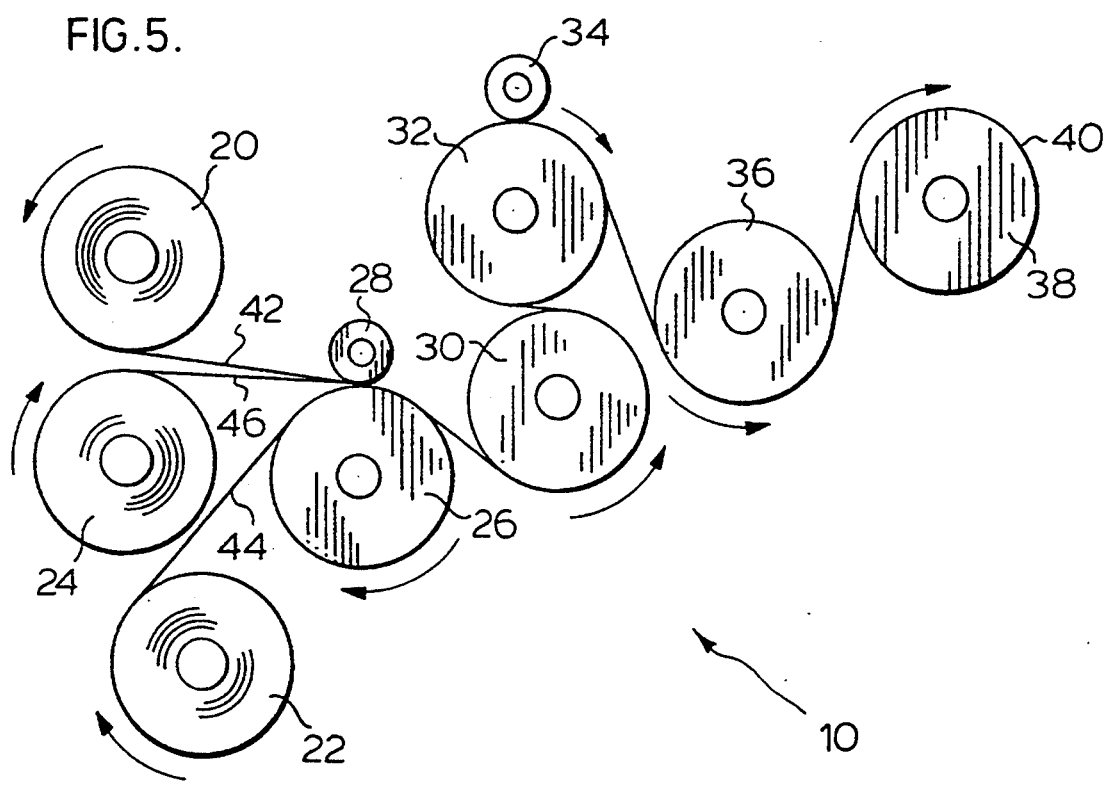
FIG. 5 is a schematic representation of a typical cold draw machine direction orienter modified to accept a plurality of thermoplastics films.

In another embodiment, a flattened blown tube of 4.5 mil ply of titanium dioxide-containing high density polyethylene and a flattened tube of 1.5 mil ply of metallic aluminum/EVA copolymer are simultaneously, together cold drawn at a machine draw ratio of 4:1 to provide a 3 mil uni-axially co-oriented unified film, using the modified cold draw machine direction orienter represented in FIG. 5. This film may be used to form a courier bag 100, according to the invention, represented in FIGS. 3 and 4.

Bag 100 has the white titanium dioxide containing polyethylene layer 102 as its outer layer and the silver coloured aluminum/EVA copolymer as an inner layer 104 in the 'folded over' or closed position. Pouch 106 contains packets to be transported (not shown), with the bag sealed by means of silicone coated paper 108 having a hot-melt adhesive layer 110.

Figure 3:
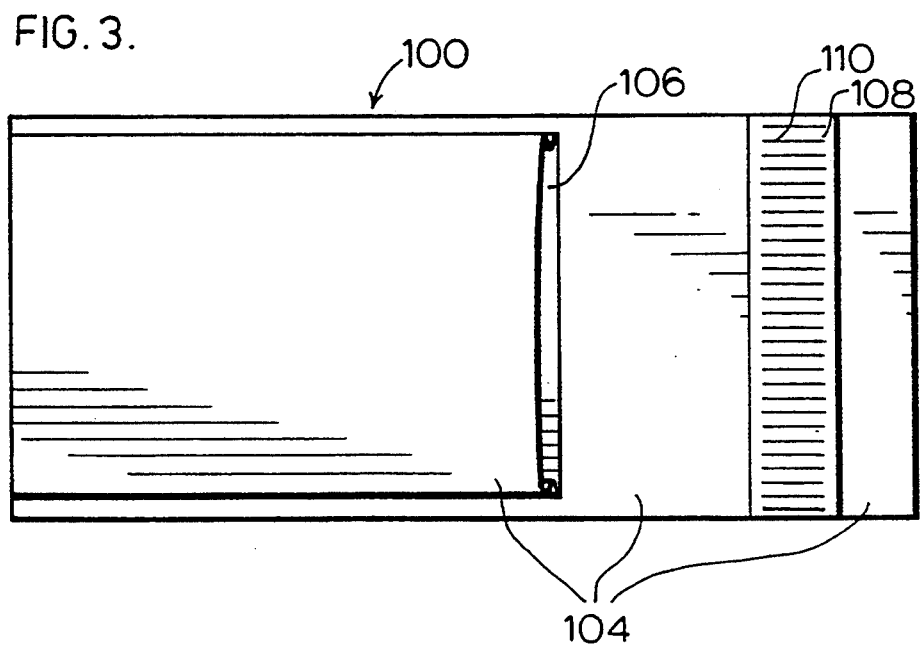
FIG. 3 represents a schematic top view of a courier bag according to the invention.

In an alternative embodiment of a courier bag according to the invention and represented by FIGS. 3 and 4, the layers 102 and 104, respectively, consist of a polypropylene/EVA co-extruded layer which had been co-ordinated with a linear low density polyethylene. With reference now to FIG. 5, the co-orienter apparatus of use in the practice of the invention shown generally as 10 comprises feed spools 20, 22 and 24, film pre-heat rolls 26, 28, slow draw roll 30, fast draw roll 32 under the influence of nip roll 34, cooling rolls 36 and storage roll 38. The arrows depict the direction of rotation of the rolls during operation resulting in a reel of uni-axially co-ordinated film 40.

In the embodiment shown, spools 20 and 22 contain reels of linear low density polyethylene films 42, 44, respectively, while spool 24 feeds-off a five-layered co-extruded 'AMEX' thermoplastic film 46.

Pre-heat rolls 26, 28 are at a sufficiently high temperature as to raise the temperature of the films to about 105° during the relatively short time the films contact rolls 26, 28. Under the influence of slow draw roll 30 and fast draw roll 32, the three film layers are simultaneously, cold drawn to form unified uni-axially co-oriented film 40. The film is cooled by roll 36 and fed on to reel 38.

Thus, it is seen that the present invention readily achieves the ends and advantages mentioned as well as those inherent therein. While certain preferred embodiments of the invention have been illustrated and described for purposes of the present disclosure, numerous changes in the arrangement and construction of elements thereof may be made by those skilled in the art which changes are encompassed within the scope and spirit of the present invention as defined by the appended claims.

I claim:

1. A thermoplastic uniaxially co-oriented film comprising a plurality of simultaneously cold drawn thermoplastic films uniaxially oriented to form a unified uni-axially co-oriented film.

2. A film as claimed in claim 1 comprising polypropylene.

3. A film as claimed in claim 1 comprising polyethylene.

4. A film as claimed in claim 3 wherein said polyethylene comprises a linear low density polyethylene.

5. A film as claimed in any one of claims 1 to 4 containing a metal in particulate form.

6. A film as claimed in any one of claims 1 to 4 comprising nylon.

7. A thermoplastic bag comprising film as defined in any one claims 1 to 4.

* * * * *